(12) United States Patent
Huang

(10) Patent No.: US 12,091,499 B2
(45) Date of Patent: Sep. 17, 2024

(54) POLYESTER

(71) Applicant: CHANG CHUN PLASTICS CO., LTD., Taipei (TW)

(72) Inventor: Ching-Jui Huang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 19 days.

(21) Appl. No.: 18/303,225

(22) Filed: Apr. 19, 2023

(65) Prior Publication Data

US 2023/0340189 A1    Oct. 26, 2023

Related U.S. Application Data

(60) Provisional application No. 63/363,411, filed on Apr. 22, 2022.

(30) Foreign Application Priority Data

Feb. 20, 2023 (TW) ................... 112106144

(51) Int. Cl.
*C08G 63/183* (2006.01)
(52) U.S. Cl.
CPC .................. *C08G 63/183* (2013.01)
(58) Field of Classification Search
USPC ................................................. 528/196, 198
See application file for complete search history.

(56) References Cited

FOREIGN PATENT DOCUMENTS

| JP | 2015-143309 A | 8/2015 |
|---|---|---|
| TW | 201000316 A1 | 1/2010 |

*Primary Examiner* — Terressa Boykin
(74) *Attorney, Agent, or Firm* — Christensen, Fonder, Dardi & Herbert PLLC

(57) ABSTRACT

A polyester is provided. The polyester comprises:
at least one repeating unit represented by formula (i), wherein $R_1$ is a $C_6$-$C_{16}$ aromatic hydrocarbyl; and

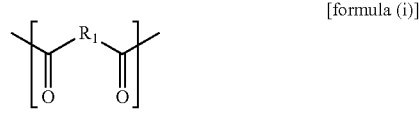

[formula (i)]

repeating units derived from diols, wherein the repeating units derived from diols comprise at least one repeating unit represented by the following formula (ii) and at least one repeating unit represented by the following formula (iii), and wherein $R_2$ to $R_5$ in formula (ii) are independently hydrogen, methyl, or ethyl,

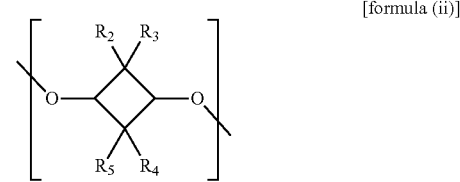

[formula (ii)]

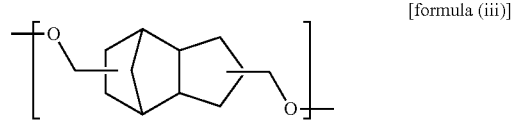

[formula (iii)]

wherein based on the total moles of the repeating units derived from diols, the amount of the repeating unit represented by the formula (ii) is 5 mol % to 50 mol %.

11 Claims, No Drawings

POLYESTER

CLAIM FOR PRIORITY

This application claims the benefits of U.S. Provisional Patent Application No. 63/363,411 filed on Apr. 22, 2022 and Taiwan Patent Application No. 112106144 filed on Feb. 20, 2023, the subject matters of which are incorporated herein in their entirety by reference.

BACKGROUND OF THE INVENTION

Field of the Invention

The present invention provides a polyester, especially a polyester with high heat resistance and high mechanical strength.

Descriptions of the Related Art

Polycarbonate (PC) is used in various applications, including food contact, packaging material, and food container, due to excellent mechanical strength. However, polycarbonate is poor in heat resistance and thus requires the addition of bisphenol A (BPA), which is harmful to human, during the synthesis of polycarbonate to improve heat resistance. The added bisphenol A can easily be released due to the hydrolysis of the polycarbonate or due to improper use (such as washing with alkaline detergent), making the polyester containing bisphenol A be restricted. There is a need for an alternative material in the art that is free of bisphenol A and has high heat resistance as well as high mechanical strength.

SUMMARY OF THE INVENTION

Given the aforementioned technical problems, a purpose of the present invention is to provide a polyester having high heat resistance and high mechanical strength while containing no bisphenol A. Therefore, the present invention comprises the following objectives.

An objective of the present invention is to provide a polyester, which comprises:

at least one repeating unit represented by formula (i), wherein $R_1$ is a $C_6$-$C_{16}$ aromatic hydrocarbyl, preferably

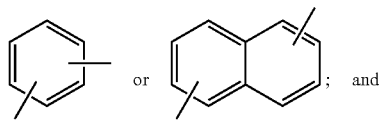; and

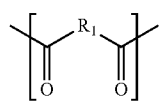

[formula (i)]

repeating units derived from diols, wherein the repeating units derived from diols comprise at least one repeating unit represented by the following formula (ii) and at least one repeating unit represented by the following formula (iii), and wherein $R_2$ to $R_5$ in formula (ii) are independently hydrogen, methyl, or ethyl, and for example, each of $R_2$ to $R_5$ can be methyl,

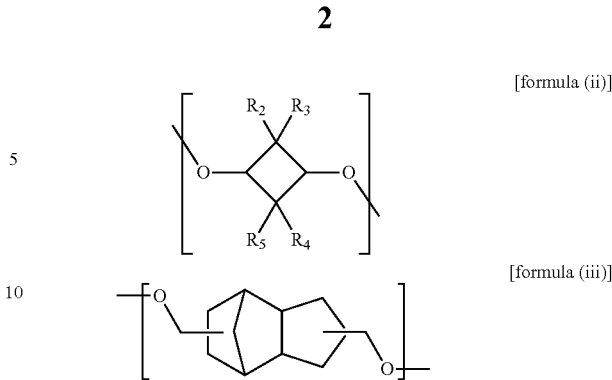

wherein based on the total moles of the repeating units derived from diols, the amount of the repeating unit represented by the formula (ii) is 5 mol % to 50 mol %.

In some embodiments of the present invention, based on the total moles of the repeating units derived from diols, the amount of the repeating unit represented by formula (iii) is 40 mol % to 95 mol %.

In some embodiments of the present invention, based on the total moles of the repeating units derived from diols, the amount of the repeating unit represented by formula (ii) is 5 mol % to 45 mol % and the amount of the repeating unit represented by formula (iii) is 55 mol % to less than 95 mol %.

In some embodiments of the present invention, the repeating units derived from diols further comprise at least one repeating unit represented by the following formula (iv), at least one repeating unit represented by the following formula (v), or a combination thereof:

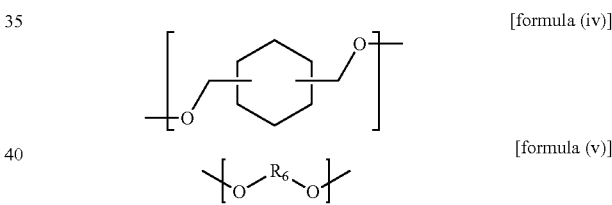

wherein $R_6$ is a $C_2$-$C_5$ linear or branched hydrocarbyl. For example, $R_6$ can be ethylene.

In some embodiments of the present invention, the repeating units derived from diols further comprise at least one repeating unit represented by formula (iv), and based on the total moles of the repeating units derived from diols, the total amount of the repeating unit represented by formula (iii) and the repeating unit represented by formula (iv) is 55 mol % or more.

In some embodiments of the present invention, based on the total moles of the repeating units derived from diols, the amount of the repeating unit represented by formula (iii) is 10 mol % to 85 mol %, and the amount of the repeating unit represented by formula (iv) is 10 mol % to 55 mol %.

In some embodiments of the present invention, the repeating units derived from diols further comprise at least one repeating unit represented by formula (v), and based on the total moles of the repeating units derived from diols, the amount of the repeating unit represented by formula (v) is 10 mol % to 25 mol %.

In some embodiments of the present invention, the repeating units derived from diols do not comprise a repeating unit derived from a linear or branched diol containing six or more carbon atoms.

To render the above objectives, technical features, and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments, and the protection scope of the present invention should not be limited to those described in the specification.

Unless it is additionally explained, the expressions "a," "the," or the like recited in the specification and in the claims should include both the singular and the plural forms.

Unless it is additionally explained, the expression "A and/or B" recited in the specification and in the claims intends to include the cases of "A", "B", and "A and B". For example, the expression "comprising dimethyl terephthalate and/or dimethyl 2,6-naphthalenedicarboxylate" intends to include "comprising dimethyl terephthalate", "comprising dimethyl 2,6-naphthalenedicarboxylate", and "comprising dimethyl terephthalate and dimethyl 2,6-naphthalenedicarboxylate".

The efficacy of the present invention over prior art lies especially in that the provided polyester has high heat resistance (Tg>115° C.) and high mechanical strength, and does not contain bisphenol A. The polyester of the present invention is described in detail below.

1. POLYESTER

The polymer main chain of the polyester of the present invention comprises at least one repeating unit derived from a dibasic acid or dibasic ester and repeating units derived from diols, or consists essentially of at least one repeating unit derived from a dibasic acid or dibasic ester and repeating units derived from diols, or consists of at least one repeating unit derived from a dibasic acid or dibasic ester and repeating units derived from diols. The components of the polyester of the present invention are described in detail below. The expression "consists essentially of at least one repeating unit derived from dibasic acid or dibasic ester and repeating units derived from diols" means that based on the total moles of all the repeating units of the polyester, the total amount of the repeating unit derived from dibasic acid or dibasic ester and repeating units derived from diols is 99 mol % or more.

1.1. Repeating Unit Represented by Formula (I)

The polymer main chain of the polyester of the present invention comprises at least one repeating unit represented by formula (i), wherein $R_1$ is a $C_6$-$C_{16}$ aromatic hydrocarbyl.

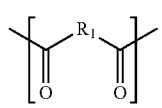

[formula (i)]

Examples of the $C_6$-$C_{16}$ aromatic hydrocarbyl include but are not limited to phenylene, methylphenylene, naphthylene, and anthrylene. In some embodiments of the present invention, $R_1$ is phenylene or naphthylene, i.e.,

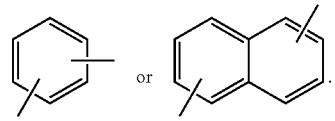

The repeating unit represented by formula (i) may be derived from a dibasic acid or dibasic ester. Examples of the dibasic acid include but are not limited to terephthalic acid, phthalic acid, isophthalic acid, 2-methyl-1,4-benzenedicarboxylic acid, 1,4-naphthalenedicarboxylic acid, 2,6-naphthalenedicarboxylic acid. The dibasic ester may be an ester having a structure corresponding to the aforementioned dibasic acid, and examples of the dibasic ester include but are not limited to dimethyl terephthalate, diethyl terephthalate, dimethyl phthalate, diethyl phthalate, dimethyl isophthalate, diethyl isophthalate, dimethyl 2-methyl-1,4-benzenedicarboxylate, dimethyl 1,4-naphthalenedicarboxylate, and dimethyl 2,6-naphthalenedicarboxylate. In some embodiments of the present invention, the polyester of the present invention comprises a repeating unit derived from dimethyl terephthalate and/or a repeating unit dimethyl 2,6-naphthalenedicarboxylate.

1.2. Repeating Units Derived from Diols

The polymer main chain of the polyester of the present invention comprises repeating units derived from diols, the repeating units derived from diols comprise at least one repeating unit represented by the following formula (ii) and at least one repeating unit represented by the following formula (iii), and wherein $R_2$ to $R_5$ in formula (ii) are independently hydrogen, methyl, or ethyl. In some embodiments of the present invention, each of $R_2$ to $R_5$ is methyl.

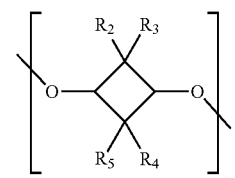

[formula (ii)]

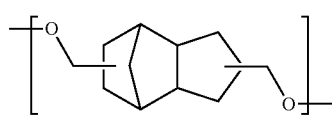

[formula (iii)]

Examples of the diol capable of deriving the repeating unit represented by formula (ii) include but are not limited to 1,3-cyclobutanediol, 2,2,4,4-tetramethyl-1,3-cyclobutanediol, 2,2,4,4-tetraethyl-1,3-cyclobutanediol. In some embodiments of the present invention, the polymer main chain of the polyester comprises a repeating unit derived from 2,2,4,4-tetramethyl-1,3-cyclobutanediol.

According to the present invention, based on the total moles of the repeating units derived from diols, the amount of the repeating unit represented by formula (ii) can be 5 mol % to 50 mol %. For example, based on the total moles of the repeating units derived from diols, the amount of the repeating unit represented by formula (ii) can be 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, or 50 mol %, or within a range between any two of the values described herein. When the amount of the repeating unit represented by formula (ii) is within the aforementioned range, the provided polyester can have excellent mechanical strength and heat resistance.

The repeating unit represented by formula (iii) is a repeating unit derived from tricyclodecane dimethanol (TCDDM) and can have one or more isomeric structures. For example, the repeating unit represented by formula (iii) can have one or more structures of

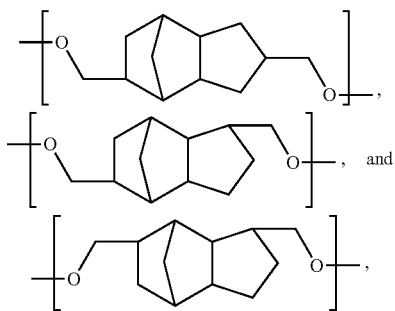

but the present invention is not limited thereto.

In the present invention, the amount of the repeating unit represented by formula (iii) can be adjusted to provide a polyester having better mechanical strength and heat resistance. In some embodiments of the present invention, based on the total moles of the repeating units derived from diols contained in the polyester, the total amount of the repeating unit represented by formula (ii) and the repeating unit represented by formula (iii) is 95 mol % or more, such as 95 mol %, 96 mol %, 97 mol %, 98 mol %, or 99 mol %, or within a range between any two of the values described herein. In this case, based on the total moles of the repeating units derived from diols, the amount of the repeating unit represented by formula (iii) can be 40 mol % to 95 mol %, preferably 55 mol % to less than 95 mol %. For example, based on the total moles of the repeating units derived from diols, the amount of the repeating unit represented by formula (iii) can be 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, or 95 mol %, or within a range between any two of the values described herein. When the amount of the repeating unit represented by formula (iii) is within the aforementioned range, the provided polyester can have better mechanical strength and heat resistance.

In some embodiments of the present invention, the repeating units derived from diols in the polyester consist of the repeating unit represented by formula (ii) and the repeating unit represented by formula (iii), wherein the amount of the repeating unit represented by formula (ii) is 5 mol % to 45 mol %, and the amount of the repeating unit represented by formula (iii) is 55 mol % to less than 95 mol %.

The polyester of the present invention may further comprise a repeating unit derived from a diol other than the repeating unit represented by formula (ii) or formula (iii). Such repeating unit derived from a diol includes at least one repeating unit represented by the following formula (iv), at least one repeating unit represented by the following formula (v), or a combination thereof. In formula (v), $R_6$ is a $C_2$-$C_5$ linear or branched hydrocarbyl, such as ethylene, propylene, butylene, or pentylene.

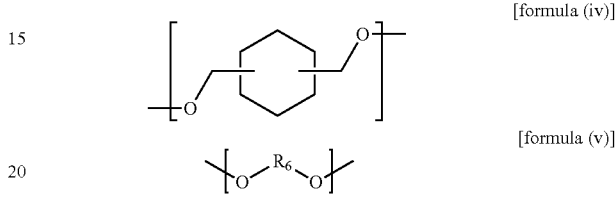

The repeating unit represented by formula (iv) is derived from cyclohexanedimethanol, such as 1,4-cyclohexanedimethanol, 1,3-cyclohexanedimethanol, or 1,2-cyclohexanedimethanol.

The repeating unit represented by formula (v) is derived from a $C_2$-$C_5$ diol, such as ethylene glycol, propylene glycol, 2-methyl-1,3-propanediol, 2,2-dimethyl-1,3-propanediol, butylene glycol, or pentylene glycol, and is preferably ethylene glycol, propylene glycol, butylene glycol, or pentylene glycol. In the appended Examples, the repeating unit represented by formula (v) is derived from ethylene glycol, i.e., $R_6$ in formula (v) is ethylene.

With the premise that the heat resistance and mechanical strength of the polyester are not disadvantageously affected, the amount of the repeating unit derived from a diol other than the repeating unit represented by formula (ii) or formula (iii) can be adjusted depending on the need.

In some embodiments of the present invention, in addition to the repeating units represented by formula (ii) and formula (iii), the polyester further comprises at least one repeating unit represented by formula (iv), and based on the total moles of the repeating units derived from diols, the total amount of the repeating unit represented by formula (iii) and the repeating unit represented by formula (iv) is 55 mol % or more, and specifically 55 mol % to 95 mol %. For example, based on the total moles of the repeating units derived from diols, the total amount of the repeating unit represented by formula (iii) and the repeating unit represented by formula (iv) can be 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, or 95 mol %, or within a range between any two of the values described herein.

In the embodiments where the polyester comprises the repeating unit represented by formula (iv), based on the total moles of the repeating units derived from diols, the amount of the repeating unit represented by formula (iii) is 10 mol % to 85 mol %, and the amount of the repeating unit represented by formula (iv) is 10 mol % to 55 mol %. For example, based on the total moles of the repeating units derived from diols, the amount of the repeating unit represented by formula (iii) can be 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, 51 mol %, 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, or 85 mol %, or within a range between any two of the values described herein; and the amount of the repeating unit represented by formula (iv) can be 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, 51 mol %, 52 mol %, 53 mol %, 54 mol %, or 55 mol %, or within a range between any two of the values described herein.

In some embodiments of the present invention, in addition to the repeating units represented by formula (ii) and formula (iii), the polyester further comprises at least one repeating unit represented by formula (v), and based on the total moles of the repeating units derived from diols, the amount of the repeating unit represented by formula (v) can be 10 mol % to 25 mol %. For example, based on the total moles of the repeating units derived from diols, the amount of the repeating unit represented by formula (v) can be 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol %, or within a range between any two of the values described herein.

In some embodiments of the present invention, the repeating units derived from diols do not comprise a repeating unit derived from a linear or branched diol containing six or more carbon atoms. Examples or the linear or branched diol containing six or more carbon atoms include but are not limited to 1,6-hexanediol, 1,7-heptanediol, 1,8-octanediol, 1,9-nonanediol, 1,10-decanediol, 3-methyl-1,5-pentanediol, 2-butyl-2-ethyl-1,3-propanediol, and 2,2-diethyl-1,3-propanediol. It is found that the existence of a repeating unit derived from a linear or branched diol containing six or more carbon atoms will damage the efficacy of the present invention in terms of especially impact strength.

1.3. Preparation of Polyester

The preparation method of the polyester of the present invention is not particularly limited, and persons having ordinary skill in the art can select suitable preparation method based on the disclosure of the specification of the subject application. For example, the polyester of the present invention can be prepared by a method comprising the following steps: mixing a corresponding dibasic ester or dibasic acid, diols, and optional additives such as a catalyst, a catalyst promoter and a heat stabilizer to form a mixture, wherein the equivalence ratio of the "diols" to the "dibasic ester and dibasic acid" in the composition is at least 1.1, preferably greater than 1.2, and more preferably greater than 1.3 to facilitate the synthesis of polyester; stirring the mixture at an elevated temperature and an elevated pressure to conduct esterification reaction to produce an oligomer, wherein the elevated temperature is, for example, from room temperature to 220° C. or from room temperature to 290° C., and the elevated pressure is, for example, 1 atm (standard atmosphere) to 6 atm, preferably 1.7 atm to 4 atm; and then subjecting the mixture comprising the oligomer to evacuation at an elevated temperature until the pressure reaches 1 torr or lower and maintaining for 30 minutes to 240 minutes to remove unreacted monomers, and optionally adding a chain extender to complete the preparation of the polyester, wherein the elevated temperature is, for example, 260° C. to 310° C.

In some embodiments of the present invention, the extent of reaction can be determined by observing the amount of the alcohols (or water, phenols, or hydrogen chloride gas) produced in the esterification reaction at an elevated temperature. Specifically, by means of theoretical calculation, one can obtain a theoretical amount of water (or alcohols, phenols, or hydrogen chloride gas) produced after all of the monomers in the mixture are reacted. When the amount of the produced alcohols (or water, phenols, or hydrogen chloride gas) reaches 80% or more (such as 85%, 90% or 95%) of the theoretical amount of alcohols (or water, phenols, or hydrogen chloride gas), the esterification reaction is completed and the successive step of evacuation can be conducted.

The catalyst, catalyst promoter and heat stabilizer can be added at the beginning of the reaction, or can be added before the evacuation. The species of the catalyst is not particularly limited, and examples thereof include but are not limited to titanium(IV) butoxide, antimony trioxide ($Sb_2O_3$), antimony acetate ($Sb(OAc)_3$), germanium dioxide ($GeO_2$), titanium(IV) isopropoxide, and butyltin tris(2-ethylhexanoate). The catalysts can be used alone or in any combination. The species of the catalyst promoter is not particularly limited, and examples thereof include but are not limited to copper acetate, zinc acetate, magnesium acetate, sodium acetate, and potassium acetate. The catalyst promoters can be used alone or in any combination. The species of the heat stabilizer is not particularly limited, and examples thereof include but are not limited to phosphoric acid, phosphorous acid, hypophosphorous acid and their salts, trimethyl phosphate (TMP), triethyl phosphate (TEP), triphenyl phosphate (TPP), 3,9-bis(octadecyloxy)-2,4,8,10-tetraoxa-3,9-diphosphaspiro[5.5]undecane, bis(2,6-di-tert-butyl-4-methylphenyl)pentaerythritol-diphosphite, tris(2,4-di-tert-butylphenyl) phosphite, and tetrakis(2,4-di-tert-butylphenyl)[1,1'-biphenyl]-4,4'-diylbis(phosphonite). The heat stabilizers can be used alone or in any combination. The species of the chain extender is not particularly limited, and an example thereof is hexamethylene diisocyanate (HDI), but the present invention is not limited thereto.

2. APPLICATIONS OF POLYESTER

The polyester of the present invention can be formed into various molded products by any molding method known in the art to which the present invention pertains, and can be applied to various fields. Examples of the molded products include but are not limited to films, laminate films, sheets, plates, stretched sheets, monofilaments, multifilaments, nonwoven fabrics, twistless yarns, staples, crimped fibers, striped tapes, composite fibers, foams, and injection molded articles. Examples of the fields to which the polyester can be applied include but are not limited to food contacts, automotive molds, commercial housewares, compounders consumers, electronic products, device housings, in-store fixtures, electronic packaging materials, outdoor signs, personal care products, cosmetics packaging, exercise apparatus, toys, and bottles.

3. EXAMPLES 3.1. Testing Methods

The present invention is further illustrated by the embodiments hereinafter, wherein the testing instruments and methods are as follows.

[Measurement of Amount of Repeating Units]

The obtained polyester is dissolved in deuterated chloroform ($CDCl_3$, available from Aldrich Company) to form a 5 mg/mL solution. A nuclear magnetic resonance (model number: AVANCE-500 NMR, available from BRUKER Company, Germany) is used to obtain $^1$H-NMR spectrum. The testing conditions are as follows: using a resonant frequency of 500 Megahertz (MHz), after completely dissolved, the detected signals are transformed into a spectrum by Fourier transformation, and the signal from $CHCl_3$ is set to be 7.24 ppm.

[Glass Transition Temperature (Tg) Test]

The glass transition temperature (Tg) of the obtained polyester is tested according to ISO 3146 using a differential scanning calorimetry (DSC, available from TA instruments Company). The higher the glass transition temperature (Tg), the better the heat resistance of the polyester.

[Tensile Strength Test]

The obtained polyester is subjected to tensile strength test according to ISO 527 using a universal testing machine (manufactured by Instron Company). The unit of the tensile strength is "MPa".

[Flexural Strength Test]

The obtained polyester is subjected to flexural strength test according to ASTM D790 using a computerized universal testing machine (model number: HT-2402, manufactured by Hung Ta Instrument Company). The unit of the flexural strength is "MPa".

[Impact Strength Test]

The obtained polyester is subjected to Izod impact test according to ISO 180 using a pendulum impact testing machine (model number: HIT-5.5P, manufactured by Zwick Roell Company). The unit of the impact strength is "$KJ/m^2$".

[Viscosity Test]

The obtained polyester is subjected to viscosity test according to ASTM D4603 using a dynamic viscometer (model number: CRC-31L, manufactured by Shuenn Yih Instrument Company), and the inherent viscosity (IV) is recorded. The unit of the inherent viscosity is "dl/g". The lower the IV value, the lower the molecular weight of the polyester.

3.2. Preparation and Property Analysis of Polyester

3.2.1. Examples 1 to 5 and Comparative Examples 1 to 3

Example 1

432.6 g of 2,2,4,4-tetramethyl-1,3-cyclobutanediol (TMCD, available from Hubei Widely Chemical Technology Company, China), 1177.7 g of tricyclodecane dimethanol (TCDDM, available from Dairen Chemical Company), and 1165.1 g of dimethyl terephthalate (DMT, available from China American Petrochemical Company) were added into an autoclave and mixed evenly to form a mixture. Afterwards, the pressure of the autoclave was set to 4 atm, and the temperature was raised slowly from room temperature to 220° C. to conduct esterification reaction. After the amount of the methanol produced from the esterification reached 90% of the theoretical amount of alcohol, the temperature of the autoclave was raised to 250° C. and evacuation was conducted for 30 minutes. Afterwards, the temperature of the autoclave was continuously maintained at 280° C. for conducting further polymerization reaction. After the reaction was completed, the temperature of the autoclave was lowered and the polyester product was collected.

Example 2

The preparation procedures of Example 1 were repeated to prepare a polyester, except that the amount of TCDDM was adjusted to 1118.9 g.

Example 3

The preparation procedures of Example 1 were repeated to prepare a polyester, except that the amount of TMCD was adjusted to 519.2 g and the amount of TCDDM was adjusted to 1060 g.

Example 4

The preparation procedures of Example 1 were repeated to prepare a polyester, except that the amount of TMCD was adjusted to 519.2 g and the amount of TCDDM was adjusted to 942.2 g.

Example 5

The preparation procedures of Example 1 were repeated to prepare a polyester, except that the amount of TMCD was adjusted to 692.2 g and the amount of TCDDM was adjusted to 706.6 g.

Comparative Example 1

The polyester of Comparative Example 1 is a polycarbonate (PC) product available from Chimei Corporation Company. The product comprises bisphenol A and has a melt flow index (MI) of 22 g/10 min measured at 300° C. and 1 kg load.

Comparative Example 2

The preparation procedures of Example 1 were repeated to prepare a polyester, except that TMCD was not used and the amount of TCDDM was adjusted to 1531.1 g.

Comparative Example 3

The preparation procedures of Example 1 were repeated to prepare a polyester, except that the amount of TMCD was adjusted to 865.3 g and the amount of TCDDM was adjusted to 588.9 g.

[Property Analysis]

The properties of the polyesters of Examples 1 to 5 (E1 to E5) and Comparative Examples 1 to 3 (CE1 to CE3), including amounts of the repeating units, glass transition temperature (Tg), tensile strength, flexural strength, impact strength, and viscosity, were tested according to the aforementioned testing methods, and the results are tabulated in Table 1. In Table 1, TMCD' refers to the repeating unit derived from TMCD (unit: mol %, based on the total moles of the repeating units derived from diols in the polyester), TCDDM' refers to the repeating unit derived from TCDDM (unit: mol %, based on the total moles of the repeating units derived from diols in the polyester), and DMT' refers to the repeating unit derived from DMT (unit: mol, based on the total moles of the repeating units derived from dibasic esters in the polyester).

TABLE 1

|  |  | E1 | E2 | E3 | E4 | E5 | CE1 | CE2 | CE3 |
|---|---|---|---|---|---|---|---|---|---|
| Repeating unit derived from diols | TMCD' (mol %) | 5 | 13 | 23 | 25 | 45 | — | — | 55 |
|  | TCDDM' (mol %) | 95 | 87 | 77 | 75 | 55 | — | 100 | 45 |
| Repeating unit derived from dibasic esters | DMT' (mol %) | 100 | 100 | 100 | 100 | 100 | — | 100 | 100 |
| Property of polyester | Tg (° C.) | 122 | 125 | 128 | 130 | 142 | 145 | 118 | 133 |
|  | Tensile strength (MPa) | 50 | 49 | 54 | 48 | 49 | 66 | 23 | 18 |
|  | Flexural strength (MPa) | 77 | 76 | 75 | 76 | 77 | 90 | 52 | 48 |
|  | Impact strength (KJ/m$^2$) | 8.82 | 13.74 | 15.2 | 21.30 | 24.80 | 8.73 | 2.21 | 4.32 |
|  | IV (dl/g) | 0.62 | 0.61 | 0.62 | 0.58 | 0.55 | — | 0.48 | 0.43 |

As shown in Table 1, the polyesters of Examples 1 to 5 of the present invention have an adequate molecular weight and excellent heat resistance, tensile strength, flexural strength, and impact strength. The commercial polycarbonate of Comparative has excellent heat resistance, tensile strength, and flexural strength, but contains bisphenol A that is harmful to human. The polyester of Comparative Example 2 does not comprise a repeating unit represented by formula (ii) (i.e., TMCD'), and the polyester has a rather low molecular weight (IV value<0.5), does not have both excellent heat resistance and mechanical strength, and especially has poor tensile strength, flexural strength, and impact strength. The polyester of Comparative Example 3 comprises a repeating unit represented by formula (ii) (i.e., TMCD') but the amount of the repeating unit represented by formula (ii) is higher than the specified range of the present invention. The polyester of Comparative Example 3 also has a rather low molecular weight (IV value<0.5) and has poor heat resistance, tensile strength, flexural strength, and impact strength. The above experimental results sufficiently manifest that the desired inventive efficacy can be provided only when the repeating unit represented by formula (ii) is comprised in the specified amount of the present invention.

3.2.2. Example 6

Example 6

The preparation procedures of Example 1 were repeated to prepare a polyester, except that 146.5 g of dimethyl 2,6-naphthalenedicarboxylate (NDC) were further added, the amount of TMCD was adjusted to 519.2 g, the amount of TCDDM was adjusted to 1060 g, and the amount of DMT was adjusted to 1048.6 g.

[Property Analysis]

The properties of the polyester of Example 6 (E6), including the amounts of repeating units, glass transition temperature (Tg), tensile strength, flexural strength, impact strength, and viscosity, were tested according to the aforementioned testing methods, and the results are tabulated in Table 2. In Table 2, TMCD' refers to the repeating unit derived from TMCD (unit: mol %, based on the total moles of the repeating units derived from diols in the polyester), TCDDM' refers to the repeating unit derived from TCDDM (unit: mol %, based on the total moles of the repeating units derived from diols in the polyester), DMT' refers to the repeating unit derived from DMT (unit: mol %, based on the total moles of the repeating units derived from dibasic esters in the polyester), and NDC' refers to the repeating unit derived from NDC (unit: mol %, based on the total moles of the repeating units derived from dibasic esters in the polyester).

TABLE 2

|  |  | E6 |
|---|---|---|
| Repeating unit derived from diols | TMCD' (mol %) | 22 |
|  | TCDDM' (mol %) | 78 |
| Repeating unit derived from dibasic esters | DMT' (mol %) | 90 |
|  | NDC' (mol %) | 10 |
| Property of polyester | Tg (° C.) | 130 |
|  | Tensile strength (MPa) | 50 |
|  | Flexural strength (MPa) | 77 |
|  | Impact strength (KJ/m$^2$) | 12.2 |
|  | IV (dl/g) | 0.61 |

As shown in Table 2, the results of Example 6 show that with the premise the amount of the repeating unit represented by formula (ii) is 5 mol % to 50 mol % based on based on the total moles of the repeating units derived from diols, the polyester of the present invention can comprise two or more repeating units represented by formula (i). The obtained polyester has an adequate molecular weight, and has excellent heat resistance, tensile strength, flexural strength, and impact strength.

3.2.3. Examples 7 to 9

Example 7

The preparation procedures of Example 1 were repeated to prepare a polyester, except that 297.9 g of ethylene glycol (EG) were further added, the amount of TMCD was adjusted to 259.6 g, and the amount of TCDDM was adjusted to 848 g.

Example 8

The preparation procedures of Example 7 were repeated to prepare a polyester, except that the amount of TMCD was adjusted to 216.3 g, the amount of TCDDM was adjusted to 883.3 g, and the amount of EG was adjusted to 186.2 g.

Example 9

The preparation procedures of Example 7 were repeated to prepare a polyester, except that the amount of TMCD was adjusted to 173.1 g, the amount of TCDDM was adjusted to 942.2 g, and the amount of EG was adjusted to 186.2 g.

[Property Analysis]

The properties of the polyesters of Examples 7 to 9 (E7 to E9), including the amounts of repeating units, glass transition temperature (Tg), tensile strength, flexural strength, and viscosity, were tested according to the aforementioned testing methods, and the results are tabulated in Table 3. In Table 3, TMCD' refers to the repeating unit derived from TMCD (unit: mol %, based on the total moles of the repeating units derived from diols in the polyester), TCDDM' refers to the repeating unit derived from TCDDM (unit: mol %, based on the total moles of the repeating units derived from diols in the polyester), EG' refers to the repeating unit derived from EG (unit: mol %, based on the total moles of the repeating units derived from diols in the polyester), and DMT' refers to the repeating unit derived from DMT (unit: mol %, based on the total moles of the repeating units derived from dibasic esters in the polyester).

TABLE 3

| | | E7 | E8 | E9 |
|---|---|---|---|---|
| Repeating unit derived from diols | TMCD' (mol %) | 19 | 15 | 7 |
| | TCDDM' (mol %) | 67 | 71 | 73 |
| | EG' (mol %) | 14 | 14 | 20 |
| Repeating unit derived from dibasic esters | DMT' (mol %) | 100 | 100 | 100 |
| Property of polyester | Tg (° C.) | 118 | 120 | 116 |
| | Tensile strength (MPa) | 50 | 50 | 50 |
| | Flexural strength (MPa) | 76 | 77 | 75 |
| | IV (dl/g) | 0.63 | 0.65 | 0.67 |

As shown in Table 3, with the premise the amount of the repeating unit represented by formula (ii) is 5 mol % to 50 mol % based on the total moles of the repeating units derived from diols, the polyester of the present invention can further comprise a repeating unit represented by formula (v) (EG'). The obtained polyesters have an adequate molecular weight, and have excellent heat resistance, tensile strength, flexural strength, and impact strength.

3.2.4. Examples 10 to 15 and Comparative Examples 4 to 6

Example 10

The preparation procedures of Example 1 were repeated to prepare a polyester, except that 173.05 g of 1,4-cyclohexanedimethanol (CHDM) were further added, and the amount of TMCD was adjusted to 475.9 g, and the amount of TCDDM was adjusted to 883.3 g.

Example 11

The preparation procedures of Example 10 were repeated to prepare a polyester, except that the amount of TMCD was adjusted to 475.9 g, the amount of TCDDM was adjusted to 883.3 g, and the amount of CHDM was adjusted to 216.3 g.

Example 12

The preparation procedures of Example 10 were repeated to prepare a polyester, except that the amount of TMCD was adjusted to 562.4 g, the amount of TCDDM was adjusted to 471.1 g, and the amount of CHDM was adjusted to 389.4 g.

Example 13

The preparation procedures of Example 10 were repeated to prepare a polyester, except that the amount of TMCD was adjusted to 475.9 g, the amount of TCDDM was adjusted to 530 g, and the amount of CHDM was adjusted to 432.63 g.

Example 14

The preparation procedures of Example 10 were repeated to prepare a polyester, except that the amount of TMCD was adjusted to 692.2 g, the amount of TCDDM was adjusted to 530 g, and the amount of CHDM was adjusted to 129.8 g.

Example 15

The preparation procedures of Example 10 were repeated to prepare a polyester, except that the amount of TMCD was adjusted to 692.2 g, the amount of TCDDM was adjusted to 117.8 g, and the amount of CHDM was adjusted to 519.2 g.

Comparative Example 4

The preparation procedures of Example 15 were repeated to prepare a polyester, except that the amount of TMCD was adjusted to 865.3 g and the amount of CHDM was adjusted to 346.1 g.

Comparative Example 5

The preparation procedures of Example 15 were repeated to prepare a polyester, except that the amount of TMCD was adjusted to 865.3 g, the amount of TCDDM was adjusted to 176.7 g, and the amount of CHDM was adjusted to 346.1 g.

Comparative Example 6

The preparation procedures of Example 15 were repeated to prepare a polyester, except that the amount of TMCD was adjusted to 519.2 g, TCDDM was not used, and the amount of CHDM was adjusted to 657.6 g.

[Property Analysis]

The properties of the polyesters of Examples 10 to 15 (E10 to E15) and Comparative Examples 4 to 6 (CE4 to CE6), including the amounts of repeating units, glass transition temperature (Tg), tensile strength, flexural strength, impact strength, and viscosity, were tested according to the aforementioned testing methods, and the results are tabulated in Table 4. In Table 4, TMCD' refers to the repeating unit derived from TMCD (unit: mol %, based on the total moles of the repeating units derived from diols in the polyester), TCDDM' refers to the repeating unit derived from TCDDM (unit: mol %, based on the total moles of the repeating units derived from diols in the polyester), CHDM' refers to the repeating unit derived from CHDM (unit: mol %, based on the total moles of the repeating units derived from diols in the polyester), and DMT' refers to the repeating unit derived from DMT (unit: mol %, based on the total moles of the repeating units derived from dibasic esters in the polyester).

TABLE 4

| | | E10 | E11 | E12 | E13 | E14 | E15 | CE4 | CE5 | CE6 |
|---|---|---|---|---|---|---|---|---|---|---|
| Repeating unit derived from diols | TMCD' (mol %) | 15 | 10 | 25 | 20 | 45 | 35 | 54 | 49 | 25 |
| | TCDDM' (mol %) | 71 | 73 | 40 | 45 | 45 | 10 | 10 | 15 | 0 |
| | CHDM' (mol %) | 14 | 17 | 35 | 35 | 10 | 55 | 36 | 36 | 75 |
| Repeating unit derived from dibasic esters | DMT' (mol %) | 100 | 100 | 100 | 100 | 100 | 100 | 100 | 100 | 100 |
| Property of polyester | Tg (° C.) | 123 | 120 | 122 | 116 | 133 | 122 | 126 | 123 | 110 |
| | Tensile strength (MPa) | 49 | 49 | 46 | 46 | 46 | 46 | 40 | 40 | 43 |
| | Flexural strength (MPa) | 72 | 77 | 66 | 69 | 69 | 67 | 68 | 63 | 63 |
| | Impact strength (KJ/m$^2$) | 16.1 | 15.2 | 18.9 | 22.5 | 21.3 | 16.2 | 6.42 | 7.12 | 16.32 |
| | IV (dl/g) | 0.62 | 0.58 | 0.55 | 0.60 | 0.52 | 0.65 | 0.43 | 0.48 | 0.80 |

As shown in Table 4, with the premise the amount of the repeating unit represented by formula (ii) is 5 mol % to 50 mol % based on the total moles of the repeating units derived from diols, the polyester of the present invention can further comprise a repeating unit represented by formula (iv) (CHDM'). The obtained polyesters can have excellent heat resistance, tensile strength, flexural strength, and impact strength. In addition, the comparison between Examples 10 to 15 and Comparative Examples 4 and 5 shows that in the case where the polyester of the present invention further comprises a repeating unit represented by formula (iv), the impact strength of the polyester can be further improved when the total amount of the repeating unit represented by formula (iii) and the repeating unit represented by formula (iv) is 55 mol % or more. The comparison between Examples 10 to 15 and Comparative Example 6 shows that the heat resistance of the polyester is insufficient and the tensile strength and the flexural strength are poor when the polyester does not comprise a repeating unit represented by formula (iii).

3.2.5. Comparative Example 7

Comparative Example 7

The preparation procedures of Example 1 were repeated to prepare a polyester, except that 141.8 g of 1,6-hexanediol (HDO) were further added, the amount of TMCD was adjusted to 519.2 g, and the amount of TCDDM was adjusted to 824.4 g.
[Property Analysis]
The properties of the polyester of Comparative Example 7 (CE7), including the amounts of repeating units, glass transition temperature (Tg), tensile strength, flexural strength, impact strength, and viscosity, were tested according to the aforementioned testing methods, and the results are tabulated in Table 5. In Table 5, TMCD' refers to the repeating unit derived from TMCD (unit: mol %, based on the total moles of the repeating units derived from diols in the polyester), TCDDM' refers to the repeating unit derived from TCDDM (unit: mol %, based on the total moles of the repeating units derived from diols in the polyester), HDO' refers to the repeating unit derived from HDO (unit: mol %, based on the total moles of the repeating units derived from diols in the polyester), and DMT' refers to the repeating unit derived from DMT (unit: mol %, based on the total moles of the repeating units derived from dibasic esters in the polyester).

TABLE 5

| | | CE7 |
|---|---|---|
| Repeating unit derived from diols | TMCD' (mol %) | 21 |
| | TCDDM' (mol %) | 58 |
| | HDO' (mol %) | 21 |
| Repeating unit derived from dibasic esters | DMT' (mol %) | 100 |
| Property of polyester | Tg (° C.) | 111 |
| | Tensile strength (MPa) | 48 |
| | Flexural strength (MPa) | 72 |
| | Impact strength (KJ/m$^2$) | 3.56 |
| | IV (dl/g) | 0.59 |

As shown in Table 5, when the polyester comprises a repeating unit derived from a linear or branched diol containing six or more carbon atoms, the impact strength of the obtained polyester is poor. Therefore, the polyester of the present invention preferably comprise no repeating unit derived from a linear or branched diol containing six or more carbon atoms.

The above examples illustrate the principle and efficacy of the present invention and show the inventive features thereof. People skilled in this field may proceed with a variety of modifications and replacements based on the disclosures and suggestions of the invention as described without departing from the principle thereof. Therefore, the scope of protection of the present invention is as defined in the claims as appended.

What is claimed is:

1. A polyester, which comprises:

at least one repeating unit represented by formula (i), wherein $R_1$ is a $C_6$-$C_{16}$ aromatic hydrocarbyl; and

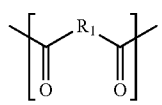
[formula (i)]

repeating units derived from diols, wherein the repeating units derived from diols comprise at least one repeating unit represented by the following formula (ii) and at least one repeating unit represented by the following formula (iii), and wherein $R_2$ to $R_5$ in formula (ii) are independently hydrogen, methyl, or ethyl,

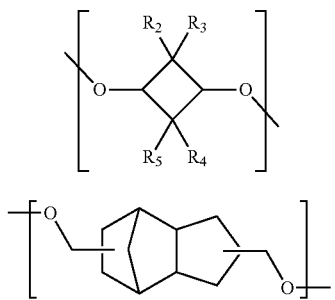
[formula (ii)]

[formula (iii)]

wherein based on the total moles of the repeating units derived from diols, the amount of the repeating unit represented by the formula (ii) is 5 mol % to 50 mol %.

2. The polyester of claim 1, wherein $R_1$ in formula (i) is

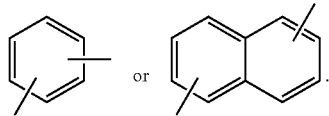

3. The polyester of claim 1, wherein $R_2$ to $R_5$ in formula (ii) are methyl.

4. The polyester of claim 1, wherein based on the total moles of the repeating units derived from diols, the amount of the repeating unit represented by formula (iii) is 40 mol % to 95 mol %.

5. The polyester of claim 4, wherein based on the total moles of the repeating units derived from diols, the amount of the repeating unit represented by formula (ii) is 5 mol % to 45 mol % and the amount of the repeating unit represented by formula (iii) is 55 mol % to less than 95 mol %.

6. The polyester of claim 1, wherein the repeating units derived from diols further comprise at least one repeating unit represented by the following formula (iv), at least one repeating unit represented by the following formula (v), or a combination thereof:

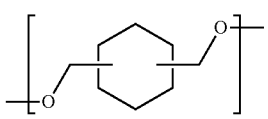
[formula (iv)]

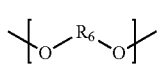
[formula (v)]

wherein $R_6$ is a $C_2$-$C_5$ linear or branched hydrocarbyl.

7. The polyester of claim 6, wherein $R_6$ is ethylene.

8. The polyester of claim 6, wherein the repeating units derived from diols further comprise at least one repeating unit represented by formula (iv), and based on the total moles of the repeating units derived from diols, the total amount of the repeating unit represented by formula (iii) and the repeating unit represented by formula (iv) is 55 mol % or more.

9. The polyester of claim 8, wherein based on the total moles of the repeating units derived from diols, the amount of the repeating unit represented by formula (iii) is 10 mol % to 85 mol %, and the amount of the repeating unit represented by formula (iv) is 10 mol % to 55 mol %.

10. The polyester of claim 6, wherein the repeating units derived from diols further comprise at least one repeating unit represented by formula (v), and based on the total moles of the repeating units derived from diols, the amount of the repeating unit represented by formula (v) is 10 mol % to 25 mol %.

11. The polyester of claim 1, wherein the repeating units derived from diols do not comprise a repeating unit derived from a linear or branched diol containing six or more carbon atoms.

* * * * *